March 16, 1965 K. W. SCHOEBEL 3,173,623

TAPE DRIVE AND BRAKE MECHANISM

Original Filed April 27, 1959 3 Sheets-Sheet 1

INVENTOR
Konrad W. Schoebel
BY
Townsend and Townsend
attorneys

March 16, 1965 K. W. SCHOEBEL 3,173,623

TAPE DRIVE AND BRAKE MECHANISM

Original Filed April 27, 1959 3 Sheets-Sheet 2

INVENTOR
Konrad W. Schoebel
BY
Townsend and Townsend
attorneys

TAPE DRIVE AND BRAKE MECHANISM

Original Filed April 27, 1959 3 Sheets-Sheet 3

INVENTOR
Konrad W. Schoebel
BY
Townsend and Townsend
attorneys

United States Patent Office 3,173,623

Patented Mar. 16, 1965

3,173,623

TAPE DRIVE AND BRAKE MECHANISM

Konrad W. Schoebel, Palo Alto, Calif., assignor to Precision Instrument Company, San Carlos, Calif.

Original application Apr. 27, 1959, Ser. No. 809,282, now Patent No. 3,083,925, dated Apr. 2, 1963. Divided and this application Aug. 23, 1962, Ser. No. 218,987

3 Claims. (Cl. 242—55.12)

This invention relates to a magnetic recording apparatus for use with magnetic tape and is a division of my copending United States patent application Serial No. 809,282, filed April 27, 1959, now Patent No. 3,083,925, which is a continuation-in-part of my original United States patent application Serial No. 737,158, filed May 22, 1958, and now abandoned.

The principal object of this invention is to provide a magnetic recording apparatus which is relatively small and light in weight and yet which provides extreme flexibility, accuracy and precision so as to allow the recorder to be used for instrumentation recording purposes.

The magnetic recording apparatus of this invention incorporates a tape drive mechanism which drives a pair of stacked reels by means of coaxial driving shafts and employs a magazine that houses the tape carrying reels. The magazine is constructed to be easily detached from the main body of the tape recording assembly in such a way that the recording stretch of tape is arranged to straddle the drive and transducer elements on the recording deck without making physical contact with the elements during installation and removal of the magazine from the main body of the recording apparatus.

Another object of the invention is to provide a novel, simple apparatus to cause a positive braking of the respective tape drive shafts in such a way that the braking force for the driving reel is substantially half that of the braking force applied to the feed reel and which further incorporates the feature of being capable of providing a limited yieldable braking force for the drive reel during the times of operational tape travel.

This apparatus thus provides the feature and advantage of supplying more force to stop the feed reel than the drive reel so that the possibility of tape breakage due to a premature stopping of the drive reel is eliminated.

Other objects of the present invention will become apparent upon reading the following specification and referring to the accompanying drawings in which similar characters of reference represent corresponding parts in each of the several views.

Figure 1:
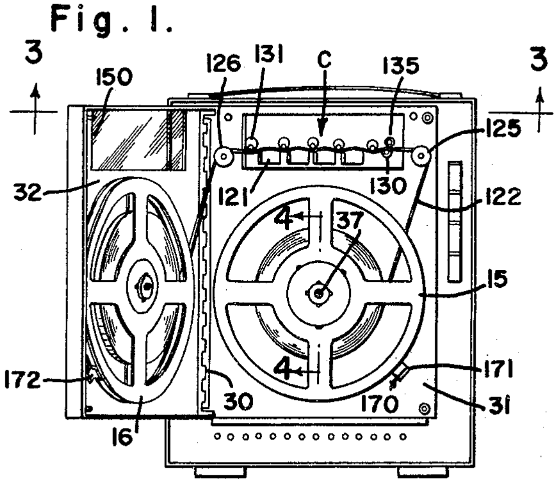
FIG. 1 is a top plan view of the tape recorder of the invention shown with the magazine attached to the recorder in the open position.

In the principal embodiment of this invention the magnetic tape recording mechanism is constructed in two major components consisting of a main body A and a magazine B which is arranged for removable attachment on the main body. Main body A has on its outer face a recording deck C comprising transducers and capstan drive elements and the interior of the main body carries the appropriate motors for driving the capstan and tape reel actuating shafts in addition to carrying the electrical components necessary for the control of the tape drive and effecting the magnetic reading and writing.

Magazine B carries a take-up reel 15 and a feed reel 16 mounted within the magazine in stacked coaxial relation in such a way that when magazine B is mounted on main body A the reels will be driven by the reel driving shafts carried by the body and a tape stretch guided by guides carried within the magazine will be arranged to pass over the magnetic transducer assembly 18 and the tape drive mechanism 19 of recording deck C.

The two reels 15 and 16 are driven by the two coaxially mounted shafts 25 and 26 which project outwardly from the face plate of body A. The outer shaft 25 is arranged to engage take-up reel 15 and the central hub of the take-up reel is apertured at 27 to allow the inner shaft 26 to operatively engage with reel 16.

Magazine B is constructed in book-like fashion having a hinge 30 which allows the two broad faces 31 and 32 of the magazine to be swung open as indicated in FIG. 1. Feed reel 16 is pivotally mounted on face 32 and take-up reel 15 is pivotally mounted on face 31. By this means when the magazine is in the open position the two reels are arranged in substantially side by side relationship and when the magazine is closed with the two broad faces 31 and 32 in spaced juxtaposition the two reels are in coaxial stacked relationship.

The bottom edge 33 of the magazine is formed with a lip 34 which is arranged to fit in a guide notch 35 on the face plate 50 of main body A. The magazine is installed on body A by inserting lip 34 into guide notch 35 and positioning the outer surface of face 31 against the face plate of the main body wherein mating snap connector elements 36 mounted on the face plate of body A and on the outer surface of face 31 are arranged to snap lock magazine B in fixed position on body A.

Figure 2:
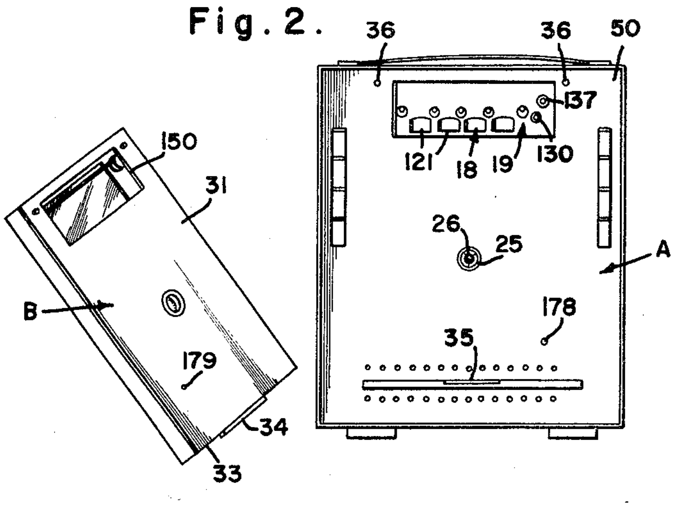
FIG. 2 is an identical view to FIG. 1 with the magazine removed and shown adjacent the tape recorder body in perspective.

As can be seen with reference particularly to FIGS. 1 and 2, the magazine when mounted on the main body may be opened in book-like fashion so that free access may be had to the two tape reels carried by the magazine. This feature allows free visual and mechanical access to each of the tape reels and allows the reels to be changed or the tape to be removed or adjusted while the magazine is installed on the recorder.

Lip 34 when engaged with notch 35 is arranged to hinge the magazine relative to body A and align the magazine so that when the magazine is swung towards body A the two shafts 25 and 26 will be in mating alignment with the respective hubs of the tape reels.

Figure 4:
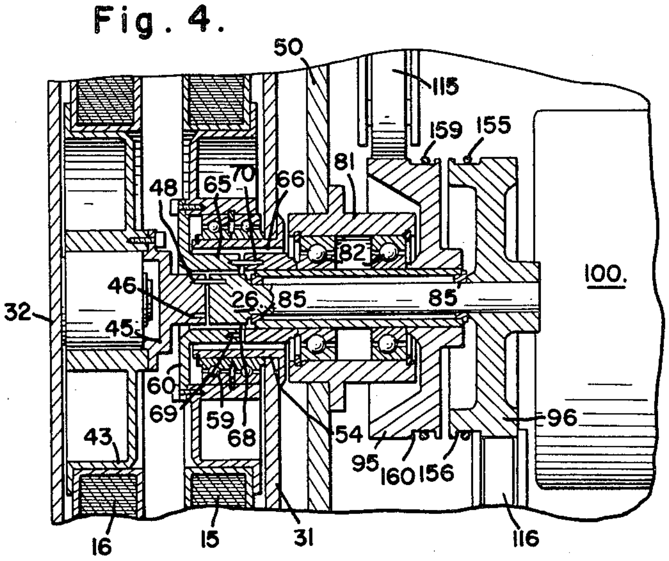
FIG. 4 is a fragmentary sectional view of FIG. 1 taken at line 4—4 and specifically showing the co-axial shafts and connection of the shafts with the take-up and feed reels within the magazine.
Figure 5:
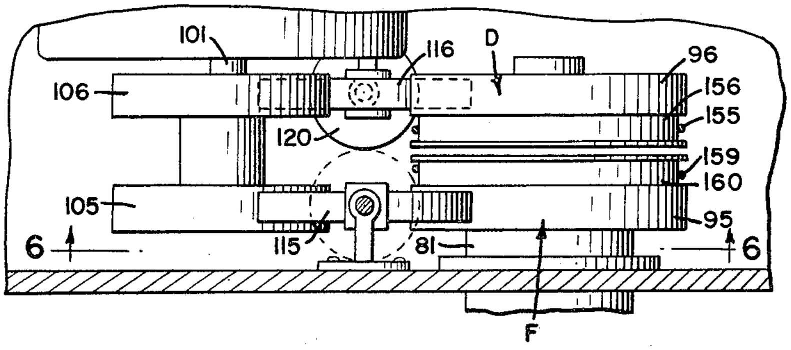
FIG. 5 is a fragmentary elevation showing the clutch and reel drive and brake mechanism.

In greater detail and with particular reference to FIG. 4, feed rail 16 is pivotally mounted on the inside of the front broad face 32 of the magazine by an axle 40 and is connected to the axle by means of bearings 44 so that the reel is freely rotatable about the axle.

An axially mounted coupling head 45 is connected on hub 43 and is formed with a tip having a coaxial annulus of apertures 46 arranged to be engaged by mating pins 48 projecting outwardly from the tip of shaft 26 so that when the pins are mated with the apertures shaft 26 and reel 16 are connected in positive engagement.

Take-up reel 15 is pivotally mounted on a hollow axle 54 fixedly mounted on rear surface 31 of the magazine and projecting inwardly therefrom. Hub 58 of reel 15 is rotatably connected to axle 54 by bearings 59 so that reel 15 is freely rotatable about the axle.

A coupling insert 60 is mounted on the inner face of hub 58 which is formed to provide a hollow annular collar 65 projecting interiorly of bore 66 of axle 54. The bore of collar 65 is formed sufficiently larger than shaft 26 and the mating section of coupling head 45 and is in axial alignment therewith so that shaft 26 can freely rotate in spaced relation to collar 65. The tip of collar 65 is provided with an annulus of apertures 69 into which pins 70, projecting outwardly from the tip of driving shaft 25, are arranged to nest to effect a connection between shaft 25 and reel 15.

Shaft 25 is pivotally connected to front face 50 of main body A by a bearing assembly 81 comprising rollers 82 positioned at two spaced apart points along the longitudinal axis of shaft 25. Shaft 26 is rotatably supported from shaft 25 by two bearings 85 mounted on substantially opposite ends of shaft 25 to position the two shafts in coaxial aligned relationship with the provision of completely free relative rotational movement.

Shaft 25 is driven by a driven pulley 95 fixedly mounted on the end of shaft 25 below bearing 81 and shaft 26 is driven by a pulley 96 mounted on the end of shaft 26 below bearing 85 and pulley 95.

A reversible constant torque motor 100 is arranged to alternately drive shafts 25 and 26 to cause reels 15 and 16 to be driven in the reverse and forward directions. The motor carries on its driving shaft 101 two driving pulleys 105 and 106 which are arranged in spaced coplanar relationship with driven pulleys 95 and 96 respectively. Two clutching idlers 115 and 116 alternately couple the motor with the respective shafts 25 and 26. The two clutching idlers 115 and 116 are alternately actuated by solenoids 119 and 120 respectively so as to clutch either driving idler 105 with driven pulley 95 or driving idler 106 with driven pulley 96.

To drive the tape drive unit in the forward direction motor 100 is driven in the forward direction. Then idler 116 is meshed with driving pulley 106 and driven pulley 96 by actuating solenoid 119 which clutches motor 100 to drive shaft 26. When solenoid 120 is energized and motor 100 is driven in the reverse direction idler 115 is forced against driving pulley 105 and driven pulley 95 to cause reverse rotation of shaft 25. Thus by control of the direction of motor 120 and the two idlers 115 and 116 through solenoids 119 and 120 either of the idlers 115 and 116 may be driven in either of two selected directions independently of the other reel.

Transducer assembly 18 and recording deck C comprises a plurality of transducers 121 over which the tape 122 carried on reels 15 and 16 is registered to travel.

Magazine B is constructed with two guide rollers 125 and 126 mounted for rotational movement about parallel axis on shafts 127 and 128 respectively. The two shafts are mounted on face 31 of the magazine.

The line of tape travel between rollers 125 and 126 is in a coplanar path on an axis skewed with respect to the rotational axis of the two reels 15 and 16. The tape twist on the stretch of tape between the two reels is absorbed in the area of tape travel between guide rollers 125 and 126 and reels 15 and 16 respectively so that the tape travel between the two guide rollers is absolutely flat and untwisted. Each of the guide rollers 125 and 126 is aligned in elevational alignment on the exact plane of the respective reels 15 and 16.

Face 31 of magazine B is formed with an aperture 150 which is arranged in alignment with recording deck C to allow the recording deck to project outwardly from face 50 of main body A of the recorder inwardly into the interior of the magazine to position transducer assembly 18 and tape drive mechanism 19 in alignment with the tape stretch between guide rollers 125 and 126.

The tape drive mechanism includes a capstan 130 which is continuously driven by a motor 131 through a belt and pulley network 132. Motor 131 is mounted directly on the rear face of the recording deck so that the rotational axis of the motor is exactly normal to the axis of the deck to facilitate precise alignment of the capstan drive linkage.

Guide rollers 125 and 126 are aligned so that the tape stretch between the two rollers is sufficiently above the face of transducers 121 and capstan 130 so as to be completely free of contact with the transducers and capstan.

Tape guide pins 135 are mounted on opposite sides of each of the transducers are are eccentrically mounted on rotatably mounted plates 136 so as to be movable from a first position above and completely free from contact with the tape stretch to a position slightly below the face of transducers 121 and in biasing contact with the tape. There is one guide pin 135 on opposite sides of each transducer so that during the reading or writing phase of tape travel the tape is held against transducers 121 by the eccentrically mounted pins so as to bias the tape against the transducer by causing the tape travel from the pins up over the transducer.

The tape drive at the recording deck is caused by a pinch roller 137 which is eccentrically mounted on a shaft 138 to force the tape against capstan 130 and cause the tape to be pulled past the recording station. The capstan and the pinch roller are mounted on a rotational axis exactly normal to the plane of recording deck C and are aligned in precise coplanar alignment with the tape stretch.

The mechanism to cause pinch roller 137 and pins 135 to be actuated is mounted on the back face of recording deck C and comprises a solenoid 140 which is arranged to control pinch roller 137 and tape guide pins 135.

Figure 6:
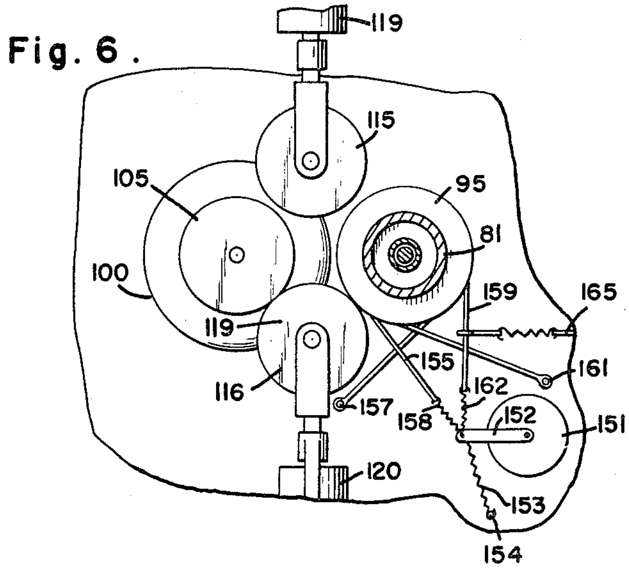
FIG. 6 is a top plan of FIG. 5 shown in reduced dimension.

A brake mechanism to stop reels 15 and 16 operates in conjunction with pulleys 95 and 96 and is actuated by a solenoid 151 of the rotating type which rotates an arm 152. The arm is biased by a spring 153 connected to an anchor pin 154. A nylon belt 155 is arranged to pass from arm 152 around a groove 156 on the rim of driven pulley 96 and is attached, after passing approximately 350° in a clockwise direction as seen in FIG. 6, to an anchor pin 157. A spring 158 is connected between nylon belt 155 and arm 152. A similar nylon belt 159 is connected to arm 152 and is arranged to pass around a groove 160 on the rim of pulley 95 in a counterclockwise direction, as viewed in FIG. 6, and after passing approximately 350° around the pulley is connected to an anchor pin 161. A spring 162 separates arm 152 and nylon belt 159.

When solenoid 151 is in the de-energized condition spring 153 has sufficient tension or biasing force to cause the two nylon belts 155 and 159 to be tightly urged against the two rings or grooves 156 and 160 of the two driven pulleys 95 and 96 respectively. The force of the nylon belt against the driven pulleys is sufficient so as to create a brake which will effectively prevent rotation of the pulleys.

When solenoid 151 is energized the solenoid acts against spring 153 and releases the tension against the two nylon belts 155 and 159 thus allowing both driven pulleys 95 and 96 to be in condition for free rotation.

Electrical circuitry, not shown, is arranged to interlock the action of solenoid 151 with solenoids 119 and 120 so that when either solenoid 119 or 120 is in the clutching condition solenoid 151, which de-actuates the braking mechanism, will be in the operative condition and conversely when both solenoids 119 and 120 are in the de-clutching condition solenoid 151 will be de-energized so that the braking action will take place.

When the tape is driven in the forward direction, that is from reel 16 to reel 15, the action of nylon belt 155 against pulley 96 is such that the braking force is pulled against spring 158 thus providing some degree of yielding in the braking force as applied to pulley 96.

The braking force, however, for reel 16, which is the feed reel in this phase of operation, is against anchor pin 161 so that there is no yielding of nylon belt 159.

By means of this mechanism the braking force for reel 16 will be immediate and positive while the braking force for feed reel 15 will be yieldable or approximately one-half of the braking force as applied to the other reel. This is an important feature in that it is necessary to supply the feed reel with substantially more force than the driving reel in order to prevent premature stoppage of the driving reel which would result in possible tape spillage.

When the recorder is operated in the rewind condition, that is when the tape is driven from reel 15 to reel 16, pulleys 95 and 96 are each driven in the opposite direction so that belt 155 will be actuated against pulley 96 against positive anchor pin 157 and conversely belt 159 will be actuated directly against spring 162 which will allow some yielding of the belt during the application of the braking force. Thus in the rewinding condition of operation reel 15 will be stopped with more positive force and reel 16 will be stopped with a more yieldable force.

Figure 3:
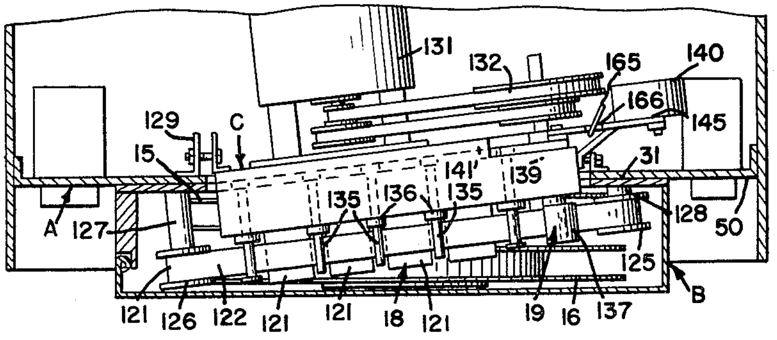
FIG. 3 is a fragmentary cross-sectional view of FIG. 1 taken at line 3—3.

During the reading and writing condition of operating it is desirable to have a minimal braking force applied to feed reel 16. The force should be sufficient so that the reel will maintain tension on the tape and will not rotate to cause unraveling or loosening of the tape on the feed reel. To accomplish this function a connecting nylon string 165 is attached to nylon belt 159 between spring 158 and driven pulley 95. String 165 is connected directly to linkage arm 145 as indicated at 166 in FIG. 3.

String 165 is connected to linkage arm 145 so that when solenoid 140 is operated to move in the clockwise direction to cause the tape recording deck to be in the operative or tape engaging condition of operation, string 165 is tensioned sufficiently to cause a slight braking force of belt 159 against driven pulley 95. This causes a sufficient dampening or braking force against reel 16 to hold tape tension. The brake mechanism thus has the function of operating directly with the operation of solenoid 140 to cause a tensioning or slight braking against the rotation for reel 16 and provides for the complete stoppage or braking of both the reels when the motor is disengaged from driving contact with both the reels.

A reel locking mechanism 170 is provided with magazine B to prevent reels 15 and 16 from rotating when the reels are disengaged from their respective driving shafts 25 and 26. When the magazine is attached to main body A and is open, as seen in FIG. 1, reel locking device 170 retains reel 16 in locked position so that the tape will remain tensioned between the two guide rollers 125 and 126.

In operation magazine B is provided with a roll of tape wound on take-up or drive reel 15 and feed reel 16 with the tape stretched between rollers 125 and 126. Solenoid 140 is moved to the open position wherein pins 135 and pinch roller 137 are substantially above the transducers as indicated in FIG. 2. The two reels 15 and 16 are rotated so that the stretch of tape between the two guide rollers 125 and 126 is taut and straight. Reel locking mechanism 170 retains the reels in condition with sufficient tension on the tape stretch between the two rollers 125 and 126 so that the tape stretch will remain constant and straight. The magazine is then installed on main body A by inserting tab 34 into notch 35 and thence rotating the magazine into position so that the two shafts 125 and 126 will nest against the coupling head 45 of reel 16 and collar 65 of reel 15 wherein pins 48 and 70 will each nest in one of the several apertures 46 and 69.

The magazine is locked in position by snap connector elements 36. Pin 178 thus penetrates the magazine and disengages reel locking mechanism 170 from locking engagement with the two reels. In this condition of operation the two nylon belts 155 and 159 lock the two driven pulleys 95 and 96 in position so that the two reels are retained in fixed position.

To cause the device to operate so that magnetic reading and writing can be effected the capstan drive motor 131 is energized to cause the capstan to drive at the required speed. The speed may be varied by selecting various pulley arrangements in pulley drive mechanism 132 or by varying the input to motor 131. Constant torque motor 100 is then energized at low powers to move in the forward direction whereinafter solenoid 119 is energized to cause clutch idler 115 to move into clutching engagement between driving pulley 105 and driven pulley 95 thus causing a constant torque force against reel 15. At the same instant solenoid 140 is energized to cause magnetic transducer assembly 18 and tape drive assembly 19 to go into operative engagement with the tape thus forcing pinch roller 137 against capstan 130 to forcefully drive the tape through the recording deck. With the application of power to solenoid 119, solenoid 151 is also energized to cause disengagement of nylon belts 155 and 159 from engagement with driven pulleys 96 and 95 while simultaneously solenoid 140 causes a tensioning of string 165 to exert sufficient tension against nylon belt 159 to cause a bias braking force against reel 16 so as to maintain the tape stretch tensioning between the two guide rollers 125 and 126 and across the recording deck.

To cause the tape to move in the rapid forward wind, solenoid 140 is moved in the opposite direction to disengage magnetic transducer assembly 18 and tape drive mechanism 19 from engagement with the tape and simultaneously motor 100 is supplied with sufficient power to cause reel 15 to rapidly wind tape from reel 16. At the same time the tensioning of string 165 is reduced so as to render brake or belt 159 completely free from braking contact with driven pulley 95 thus allowing for the free forward wind of the tape on the reel.

To stop the device solenoid 119 is released to withdraw clutch idler 115 from clutching engagement between the motor and reel 15 which simultaneously disengages solenoid 151 so that spring 153 causes the two nylon belts 155 and 159 to brake and stop the rotation of the two reels.

To cause the tape to operate in the reverse direction, that is to rewind the tape, constant torque motor 100 is energized to cause the motor to rotate in the reverse direction. Solenoid 120 is then actuated to cause clutching idler 116 to engage driving pulley 106 and driven pulley 96. At the same time solenoid 151 is energized to de-energize the brake mechanism thus causing the tape to rewind onto reel 16 from reel 15. To stop the device solenoid 120 is released to withdraw clutch idler 116 from engagement with the driving and driven pulleys and solenoid 151 is released to actuate the brake mechanism.

Although the foregoing invention has been described in some detail by way of illustration and example for purposes of clarity of understanding it is understood that certain changes and modifications may be practiced within the spirit of the invention as limited only by the scope of the appended claims.

I claim:

1. In a recording device comprising a pair of concentric relatively rotatable shafts for driving tape carrying reels; a motor; a pair of driving pulleys driven by said motor; a pair of driven pulleys each mounted to a respective one of the coaxial shafts; each of said driven pulleys being in coplanar alignment with one of said driving pulleys and in spaced relation thereto; a pair of clutching pulleys mounted between said driving and said driven pulleys; each said clutching pulley being in coplanar alignment with the respective said driving and driven pulleys; means to move said clutching pulleys into and out of driving relationship with said driven and driving pulleys; a pair of brake bands each wrapped around an individual one of said driven pulleys; a pair of fixed anchors each connected to one end of individual ones of said brake bands; and a selective movable anchor resiliently connected to the other ends of said bands, said anchor points being operable to exert a tensional force on one of said bands against the fixed anchor and a tensional force on the other said band against the movable anchor when said shafts are rotated in the same direction and wherein said movable anchor is operable to increase or decrease the tension on each band.

2. In a magnetic recording device of the type having a pair of coaxially independently rotatable shafts for driving tape carrying reels the combination of: a motor; a pair of driving pulleys driven by said motor; a pair of driven pulleys each mounted to a respective one of the coaxial shafts; each of said driven pulleys being in coplanar alignment with one of said driving pulleys and in spaced relation thereto; a pair of clutching pulleys mounted between said driving and said driven pulleys; each said clutching pulley being in coplanar alignment with the respective said driving and driven pulleys; means to move said clutching pulleys into and out of driving relationship with said driven and driving pulleys; a first brake band mounted to an anchor point and engaging a portion of the surface of a first one of said driven pulleys; a second brake band connected to a second anchor point and arranged to engage a portion of the second of said driven pulleys; each said brake band being arranged to pass from the respective first and second anchor points in opposite directions around the wall of a portion of respective said pulleys; resilient means connected to the opposite ends of each brake band; said resilient means connected to a third anchor point; and means to move said third anchor point to a first position to simultaneously tension the two brake bands and to a second position to simultaneously relax the tensioning of said brake bands.

3. In a tape recorder of the type having two independently rotatable concentric shafts each arranged to drive one of a pair of tape carrying feed and tape take up reels, the improvement comprising: a tubular shaft connected to rotate one of the reels; a second shaft mounted inside said tubular shaft in concentric relationship therewith and being connected to rotate the other said reel, a pair of selectively driven pulleys each connected to a separate one of said concentric shafts; a pair of brake bands each being mounted at one end to fixed anchor points, each brake band being wrapped around separate ones of said driven pulleys in opposite directions; the other ends of said brake bands being resiliently connected to a common anchor at one common point thereon; said anchor arm being selectively movable to simultaneously tension the pair of brake bands, one brake band supplying more force to stop one pulley than the other brake band to stop the other pulley when said shafts are rotated in the same direction.

References Cited by the Examiner

UNITED STATES PATENTS

| | | | |
|---|---|---|---|
| 2,528,061 | 10/50 | Knapp | 242—54.1 |
| 2,632,060 | 3/53 | Foote et al. | 242—54.1 X |
| 2,868,470 | 1/59 | Selsted | 242—55.12 |
| 2,911,162 | 11/59 | Kyle | 242—55.12 |
| 2,983,457 | 5/61 | Toro | 242—55.12 |

FOREIGN PATENTS

| | | |
|---|---|---|
| 1,024,985 | 1/53 | France. |

MERVIN STEIN, *Primary Examiner.*

RUSSELL C. MADER, *Examiner.*